(12) United States Patent
Besling

(10) Patent No.: US 8,794,075 B2
(45) Date of Patent: Aug. 5, 2014

(54) MULTILAYERED NONON MEMBRANE IN A MEMS SENSOR

(75) Inventor: Willem Frederik Adrianus Besling, Eindhoven (NL)

(73) Assignee: NXP, B.V., Eindhoven (NL)

( * ) Notice: Subject to any disclaimer, the term of this patent is extended or adjusted under 35 U.S.C. 154(b) by 214 days.

(21) Appl. No.: 13/207,626

(22) Filed: Aug. 11, 2011

(65) Prior Publication Data

US 2013/0036827 A1 Feb. 14, 2013

(51) Int. Cl.
*G01L 7/08* (2006.01)

(52) U.S. Cl.
USPC ............................................. 73/715; 73/754

(58) Field of Classification Search
USPC .................................................... 73/700–756
See application file for complete search history.

(56) References Cited

U.S. PATENT DOCUMENTS

| | | | |
|---|---|---|---|
| 6,675,656 B1 | 1/2004 | Ploechinger | |
| 6,945,115 B1 * | 9/2005 | Wang | 73/718 |
| 8,012,360 B1 * | 9/2011 | Sippola | 216/13 |
| 8,513,745 B2 | 8/2013 | Steeneken et al. | |
| 2002/0066319 A1 * | 6/2002 | Beach et al. | 73/754 |
| 2003/0094047 A1 * | 5/2003 | Torkkeli | 73/716 |
| 2005/0204821 A1 * | 9/2005 | Fischer et al. | 73/715 |
| 2010/0224004 A1 * | 9/2010 | Suminto et al. | 73/727 |
| 2010/0275675 A1 * | 11/2010 | Seppa et al. | 73/24.01 |
| 2012/0167659 A1 | 7/2012 | Besling et al. | |

FOREIGN PATENT DOCUMENTS

| | | |
|---|---|---|
| EP | 2402284 A1 | 1/2012 |
| JP | 59 138383 A | 8/1984 |
| WO | 2010032156 A2 | 3/2010 |

OTHER PUBLICATIONS

Extended European Search Report dated Dec. 12, 2012 in corresponding European Application No. 1215091.3-1236.
Machida, Shuntaro; "MEMS Technology using Back-end of Line Processes in CMOS LSI"; IEEE 2010 International Internconnect Technology Conference (IITC), Burlingame, CA, USA; 3 pages (Jun. 2010).
Iliescu, Ciprian, et al; "Low Stress PECVD SiNx Process for Biomedical Application"; IEEE International Semiconductor Conferences, CAS 2007, vol. 1; 4 pages (2007).
Caliano, G., et al.; "cMUT Echographic Probes: Design and Fabrication Process"; Proceedings IEEE Ultrasonics Symposium, vol. 2; 4 pages (2002).
Walmsley, Byron A., et al.; "Poisson's Ratio of Low-Temperature PECVD Silicon Nitride Thin Films"; J. of Microelectromechanical Systems, vol. 16, No. 3; 6 pages (Jun. 2007).
Fujimori, T., et al.; "Above-IC Integration of Capacitive Pressure Sensor Fabricated with CMOS Interconnect Processes"; IEEE 20th International Conference on Micro Electro Mechanical Systems 2007, Kobe Japan; 4 pages (Jan. 2007).
Chavan, Abhijeet V., et al; "Batch-Processed Vacuum-Sealed Capacitive Pressure Sensors"; J. Microelectromechanical Systems, vol. 10, No. 4; 9 pages (Dec. 2001).

(Continued)

*Primary Examiner* — Andre Allen

(57) ABSTRACT

Various embodiments relate to a MEMS pressure sensor including: a lower electrode; a first insulating layer over the lower electrode; a second insulating layer over the first insulating layer that forms a cavity between the first and second insulating layers; an upper electrode over the second insulating layer, wherein a portion of the cavity is between the upper and lower electrodes; and a NONON pressure membrane over the upper electrode.

22 Claims, 4 Drawing Sheets

(56) References Cited

OTHER PUBLICATIONS

Knight, Joshua G., et al; "Fabrication and Characterization of cMUTs for Forward Looking Intravascular Ultrasound Imaging"; 2003 IEEE Symposium on Ultrasonics, vol. 1; 4 pages (2003).

Caliano, G., et al.; "Micromachined Ultrasonic Transducers Using Silicon Nitride Membrane Fabricated in PECVD Technology"; 2000 IEEE Ultrasonics Symposium, vol. 1; 6 pages (2000).

* cited by examiner

MULTILAYERED NONON MEMBRANE IN A MEMS SENSOR

TECHNICAL FIELD

Various exemplary embodiments disclosed herein relate generally to a multilayered NONON pressure membrane in a MEMS sensor.

BACKGROUND

Designing a MEMS sensor to operate in a harsh environment presents a number of issues. An example is a MEMS pressure sensor incorporated in a rechargeable lithium ion battery system. In order to guarantee reliable operation the parts that may be in direct contact with the liquid electrolyte inside the cell should effectively block water and Li-ion diffusion and other heavy metal ions typically present in such cells ($Mn^{2+}$, $Co^{2+}$, $Fe^{2+/3+}$). Especially the pressure membrane that may be in direct contact with the liquid electrolyte may be subject to potential water and Li-ion penetration because it may be flexible and thin. If diffusion occurs in the pressure membrane, pressure sensor operation may critically degrade. Accordingly, designing an accurate MEMS sensor requiring a membrane in a harsh environment where it is necessary to provide an effective barrier against various materials present in the operating environment presents a number of issues.

SUMMARY

Accordingly, there is a need for a membrane that allows for accurate MEMS pressure sensors to operate in harsh environments. Provided are embodiments that enable a multilayered NONON membrane in a MEMS pressure sensor.

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may also relate to a MEMS pressure sensor including: a lower electrode; a first insulating layer over the lower electrode; a second insulating layer over the first insulating layer that forms a cavity between the first and second insulating layers; an upper electrode over the second insulating layer, wherein a portion of the cavity is between the upper and lower electrodes; and a NONON pressure membrane over the upper electrode.

Various embodiments may also relate to a method of producing a MEMS pressure sensor, including: forming a lower electrode on a substrate; forming a first insulating layer over the lower electrode; forming a sacrificial layer on the first insulating layer; forming a second insulating layer over the sacrificial layer and the second insulating layer; forming an upper electrode on the second insulating layer; forming a third insulating layer over the upper electrode and the second insulating layer; forming a hole through the second and third insulating layers to expose the sacrificial layer; etching the sacrificial layer to form a cavity; and plugging the hole with a metal plug to produce a vacuum in the cavity.

BRIEF DESCRIPTION OF THE DRAWINGS

In order to better understand various exemplary embodiments, reference is made to the accompanying drawings wherein.

DETAILED DESCRIPTION

Figure 1:
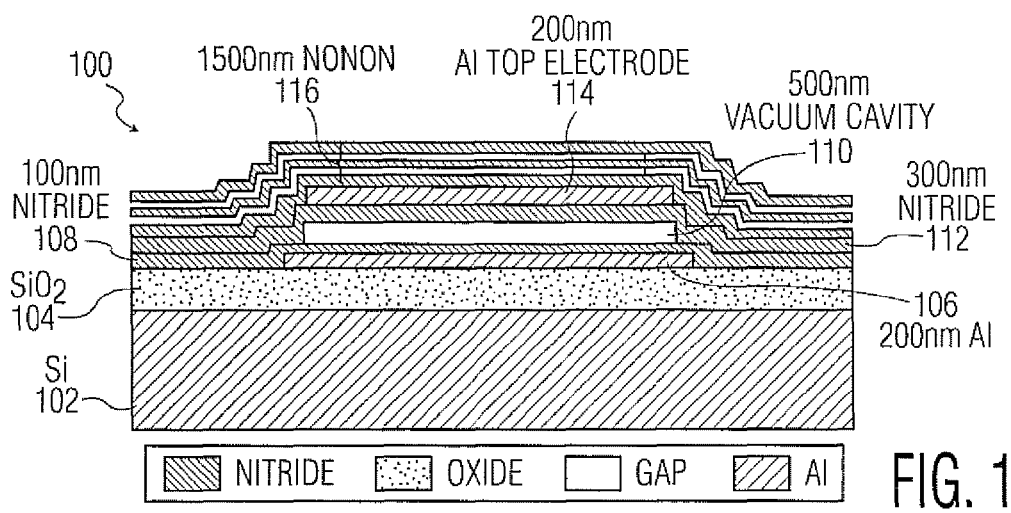
FIG. 1 illustrates an MEMS pressure sensor according to an embodiment of the invention.

Referring now to the drawings, in which like numerals refer to like components or steps, there are disclosed broad aspects of various exemplary embodiments.

MEMS pressure sensors rely on an accurate measurement of the deflection of a suspended membrane (e.g., silicon, silicon germanium, silicon oxide, or silicon nitride). They may have a capacitive read-out and are as such well known in the art. The cavity underneath the membrane may be sealed from the environment in order to have a known and stable reference pressure.

For example, a thin circular suspended SiN membrane may be employed as capacitive pressure gauge. The cavity underneath the SiN membrane may be hermitically closed by employing a PECVD SiN process. The pressure sensor performance may largely be determined by the physical, mechanical and structural properties of this SiN film and the thickness of the plug necessary to close to holes to close the cavity. The density and composition of the SiN film may determine the out-gassing behavior and diffusion barrier properties. Internal stress and thickness of the SiN film may determine the membrane rigidity and hence the sensitivity of the pressure sensor.

Currently most micro machined pressure sensors use a hermetically sealed membrane that seals a reference cavity which is at a certain gauge pressure and in some cases the gauge pressure is a vacuum. The external pressure may be determined because the pressure difference between the external pressure and the pressure in the cavity generates a force on the membrane that causes the membrane to deflect. This deflection is then measured by capacitive sensors. There are several issues related to this type of pressure sensor design which are now discussed. The gas pressure in the reference cavity needs to be very stable. This may require a very high level of hermiticity of the pressure membrane. However, in order to have a large deflection and sensitivity, the thickness of the pressure membrane should be thin and/or it should have a large area. Because making very thin membranes hermetic presents a number of issues, these may be conflicting requirements and may lead to a larger sensor size.

Further, the out-gassing of layers in the pressure sensor needs to be minimized. If the reference cavity is not a vacuum, it may have a certain pressure and this pressure may be temperature dependent according to Boyle's law ($P*V=n*R*T$). Thus, the pressure sensor becomes more temperature dependent.

Additionally, pressure sensors may have an interface with the outer world that needs to be resistant against corrosive attack, diffusion, etc., while still being flexible enough to deflect. For example, in automotive rechargeable battery systems Li-ion electrolytes are present that may diffuse readily through pressure capturing membranes. Employing a pressure sensor with a silicon pressure membrane and a piezo resistive read-out are not ideally suited for this goal as lithium easily diffuses into the silicon without a proper cap or diffusion barrier.

Another important aspect is the pressure sensor size and manufacturing cost of the device. Stand-alone pressure sensors may require a separate read-out IC and thus may have the disadvantage of being large and more costly due to additional packaging costs. Integration of the pressure sensor and read-out die may improve performance and reduce size and cost.

Therefore, efforts have been made to develop a pressure membrane that is able to withstand gas and mobile ion diffusion into the membrane and/or the cavity while being thin and flexible enough to be able to detect small pressure changes with sufficient sensitivity. Further, efforts have been made to develop a manufacturing process to construct a MEMS cavity on top of CMOS circuit having a capacitive read-out.

An embodiment may include a MEMS pressure sensor having a sealed cavity having a multilayered pressure capturing membrane with a capacitive read-out. The membrane may be able to withstand gas and mobile ion diffusion while being thin and may be flexible enough to be able to detect small pressure changes. The membrane may be composed of a NONON dielectric stack to prevent diffusion along interfaces, grain boundaries, defects, particles, or pin holes through the stacked layers. The multilayer approach may ensure excellent hermetic membrane while still being thin and flexible enough to capture small pressure variations.

The NONON stack may be composed of multiple, alternating silicon nitride-silicon oxide films creating a NONON repetitive structure. The SIN and the SiO films each may provide different functions. The silicon nitride film may better prevent mobile ion diffusion, but it may be important to alternate the nitride layers with silicon oxide or silicon oxide-nitride to keep hydrogen out-gassing into the cavity as low as possible, to reduce/control the stress in the membrane, and to optimize the Young's modulus.

The NONON stack may be produced by thin film deposition in one process chamber, for example, using plasma enhanced chemical vapor deposition (PECVD). Low-temperature processing may allow manufacturing of the device on top of a CMOS device.

In order to manufacture the cavity below the NONON membrane, a metal sacrificial layer may be used. The use of a metal sacrificial layer (e.g., Mo or Al) may allow for the control of the gap height and lateral dimensions of the cavity. This is due to a better etching selectivity of the metal against silicon nitride than the etching selectivity of silicon oxide against silicon nitride when for instance a HF vapor based sacrificial etch is employed.

Alternatively, silicon oxide may be employed as a sacrificial layer. This allows usage of a HF vapor based dry etch method which may be beneficial to avoid sticking. If such method is used, the membrane overlying the cavity must be composed of a metal (e.g. Al, W, TiW or TiN) or be silicon based (monocrystalline Si, poly-Si, SiC, SiGe, or a metal silicide) to ensure sufficient selectivity against the HF vapor.

Finally, an Al plug may be used to seal the cavity that may result in reducing the residual pressure inside the cavity that makes the sensor less temperature dependant.

FIG. 1 illustrates an MEMS pressure sensor according to an embodiment of the invention. This embodiment may be a MEMS pressure sensor 100 incorporated in a rechargeable lithium ion battery system. In order to have reliable operation, the portion of the MEMS pressure sensor 100 that are in direct contact with the liquid electrolyte within the cell should effectively block water and Li-ion diffusion and other heavy metal ions typically present in such cells ($Mn^{2+}$, $Co^{2+}$, $Fe^{2+/3+}$). The pressure membrane that may be in direct contact with the liquid electrolyte is subject to potential water and Li-ion penetration because the pressure membrane may be flexible and thin. If diffusion occurs, the device operation may critically degrade.

The MEMS pressure sensor 100 may be formed on a silicon substrate 102 having an insulating layer 104 made of $SiO_2$. The insulating layer 104 may be made of other insulating materials as well. The MEMS pressure sensor 100 includes a lower electrode 106 formed on the insulating layer 104. The lower electrode may be a 200 nm thick layer of Al, but other materials such as W, TiN, Si, SiGe, metal silicides may be used as well, and thicknesses may be used according to the specific requirements of the MEMS pressure sensor 100 and any other devices that may be simultaneously manufactured on the same silicon substrate 102. Next a first insulating layer 108 may be formed over the lower electrode 106. This layer may be composed of $Si_3N_4$ and 100 nm thick, but other insulating materials like SiC and other thicknesses may be used as well.

The MEMS pressure sensor 100 also includes a vacuum cavity 110. The vacuum cavity 110 may be formed between the second insulation layer and a third insulation layer 112. Again, the third insulation layer may be SiN 300 nm thick, but other insulating materials and thicknesses may be used as well. Next, an upper electrode 114 is formed on the third insulation layer. The upper electrode may be a 200 nm thick layer of Al, but other materials such as W, TiN, Si, SiGe, metal silicides may be used as well, and thicknesses may be used according to the specific requirements of the MEMS pressure sensor 100 and any other devices that may be simultaneously manufactured on the same silicon substrate 102. Over the upper electrode 114, a pressure membrane 116 is formed. This pressure membrane 116 will be discussed in greater detail below.

Figure 2:
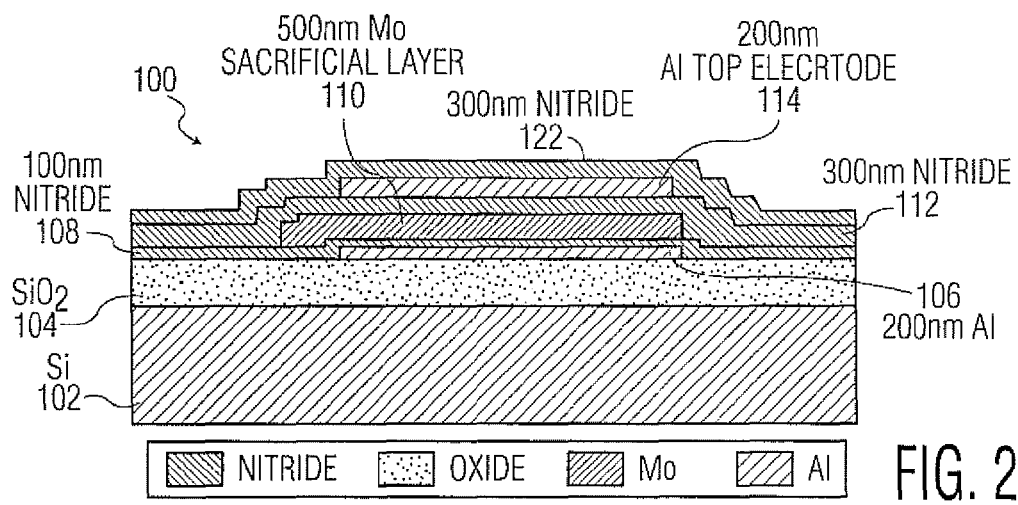
FIG. 2 illustrates the first steps for manufacturing the MEMS pressure sensor.

Now an embodiment of a method for manufacturing the MEMS pressure sensor 100 is provided. FIG. 2 illustrates the first steps for manufacturing the MEMS pressure sensor 100. A lower electrode 106 may be formed by depositing and subsequently patterning a metal layer on a substrate 102. This layer may, for example, be made of aluminum 200 nm thick and may be deposited using physical vapor deposition (PVD). Further, the substrate 102 may further include a substrate insulating layer 104 of silicon oxide or silicon nitride on a bare silicon wafer 102 or an insulating layer on top of a CMOS wafer with integrated electronic circuitry underneath. Next, a first insulating layer 108 made of silicon nitride, silicon carbide or silicon oxide may be deposited on top of the lower electrode 106 and substrate 102 using plasma-enhanced chemical vapor deposition (PECVD) or low-pressure chemical vapor deposition (LPCVD).

Next, a sacrificial layer 118 may be deposited. The sacrificial layer 118 may include a 300-500 nm thick metallic layer, for example, Mo, Al or Cr or a dielectric layer, for example, $SiO_2$. The sacrificial layer 118 may be patterned in a circular shape with flaps 120. The sacrificial layer 118 may be patterned into other shapes as well. The flaps 120 are outside the circular shape in order to provide a way to access this layer during etching of the sacrificial layer 118. A larger sacrificial layer thickness creates a larger gap and may allow a larger pressure sensing range, but may result in an overall a smaller sensitivity. A smaller thickness of the sacrificial layer 118 may result in greater effort to remove the sacrificial layer 118.

Next, a second insulating layer 112 may be deposited. The thickness of the second insulating layer may affect the capacitance between the lower electrode 106 and the upper electrode 114. As the thickness decreases, the capacitance increases, and as the thickness increases, the capacitance decreases. Increasing the capacitance between the lower electrode 106 and the upper electrode 114 may increase the S/N ratio of the resulting MEMS pressure sensor 100.

If the sacrificial layer 118 is formed of $SiO_2$, then either the first insulating layer 108 or the second insulating layer 112 may be omitted, allowing either the lower or the upper electrode 106, 114 to be in contact with the sacrificial layer 118. In this situation, the upper and lower electrodes 106, 114 do not need to be protected from the etching of the sacrificial layer 118 made of $SiO_2$.

The upper electrode 114 is then formed by depositing a metal layer and patterning the layer. The upper electrode 114 may be 100-200 nm thick and be made of Al but other materials such as W, TiN, Si, SiGe, metal silicides may be used as well. The upper electrode 114 may then be capped with a third insulating layer 122. The third insulating layer 122 may be formed using PECVD to deposit silicon nitride or silicon oxide layer. After further processing, the third insulating layer will become a part of the pressure membrane 116.

Figure 3:
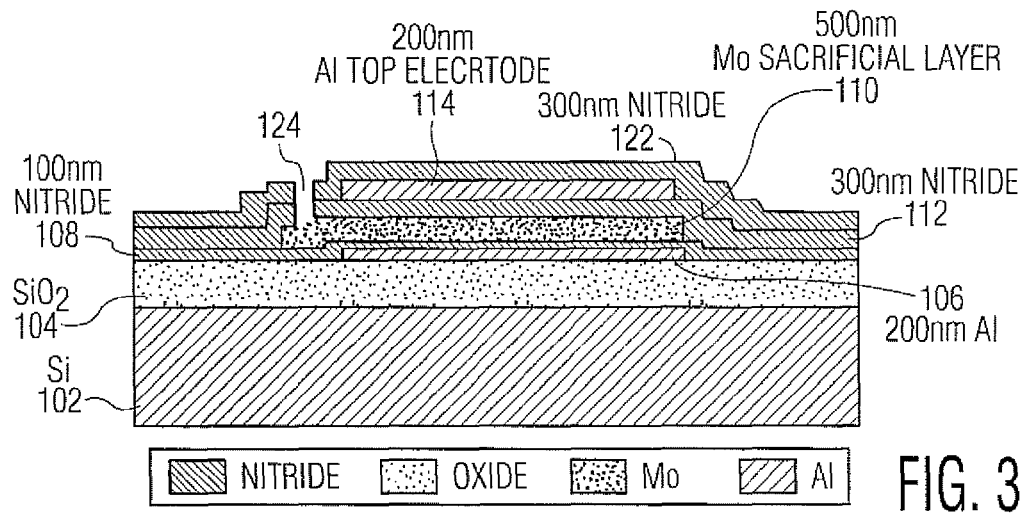
FIG. 3 illustrates the formation of the pressure sensor cavity by the etching of the sacrificial layer.

FIG. 3 illustrates the formation of the pressure sensor cavity by the etching of the sacrificial layer. One or more holes 124 may be formed in the third insulating layer 122 by patterning and dry etching the third insulating layer 122. These holes 124 may be placed circumferentially around the sacrificial layer 118. Further, these holes 124 may also be outside the area of the upper and lower electrodes 106, 114 and may be 0.5-2 um in diameter. The larger the hole diameter the easier it is to remove the sacrificial layer 118. However, it also may become more difficult to seal the cavity afterwards with larger holes 124.

Next, a cavity 110 (see FIG. 4) may be formed by etching the sacrificial layer 118. The Al or Mo sacrificial layer 118 may be selectively removed by etching with, for example, a mixture of phosphoric acid, sulphuric acid, and acetic acid. A silicon oxide sacrificial layer 118 may be selectively removed by etching with HF vapor.

Figure 4:
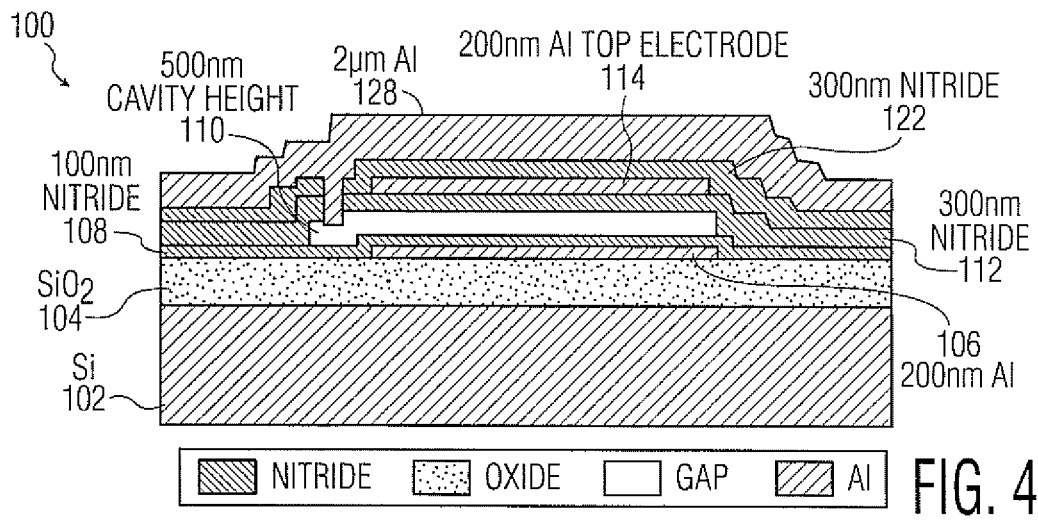
FIGS. 4 and 5 illustrate forming a plug in the holes.
Figure 5:
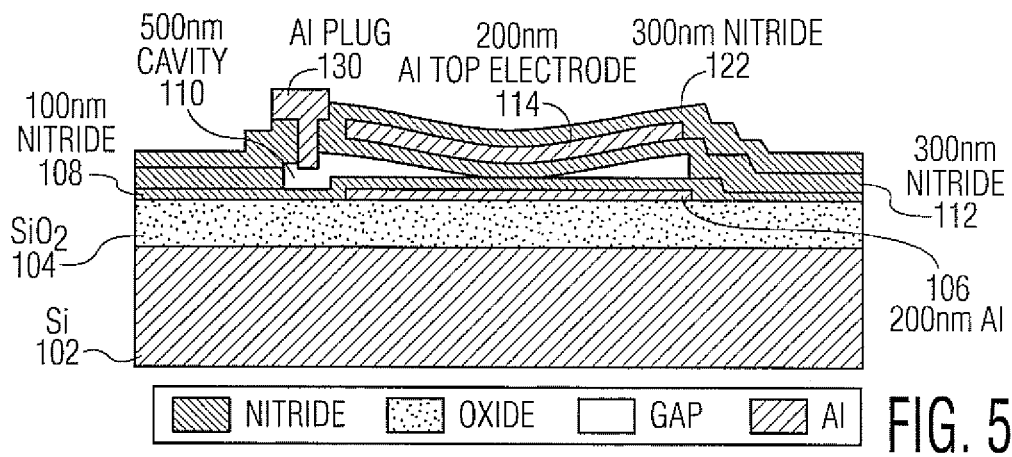

FIGS. 4 and 5 illustrate forming a plug in the holes. A metal layer 128 about 2 um thick may be formed by depositing Al at a temperature of 350° C. to create "Al reflow" into the holes 124 to effectively seal the hole without a seam. Using PVD to deposit the metal layer 128 may be beneficial to reduce base pressure and avoids undesired pressure variations in the cavity 110 due to thermal expansion of the gas. The use of LPCVD or PECVD to seal the cavity 110 may result in a relative large base pressure inside the cavity. Accordingly, the use of PVD has advantages over the use LPCVD or PECVD to form the metal layer 128. The thickness of the metal layer 128 that may be required for effective closure depends on the diameter of the holes 124 and the gap height. For a very large diamater holes, for example 2 um, a 3-5 um thick metal layer 128 is required for closure, for 1 um diameter holes a 1.5-2 um thick metal layer 128 is required. The metal layer 128 may be removed from the third insulating layer 122 by etching to form a metal plug 130 that seals the cavity 110. If the pressure and temperature sensitivity of the MEMS pressure sensor 100 is less important, the upper electrode 114 and metal plug 130 may be formed in the same etching step.

Once the metal plug 130 is in place, the MEMS sensor device 100 may appear as shown in FIG. 5 when exposed to ambient pressure. The upper electrode 114 is shown as bent into the cavity 110 due to the pressure difference between the cavity 110 and the ambient pressure. The exact structure of the second insulating layer 112, the upper electrode 114, and the third insulating layer 112 will affect the amount of compression do to the pressure difference.

Figure 6:
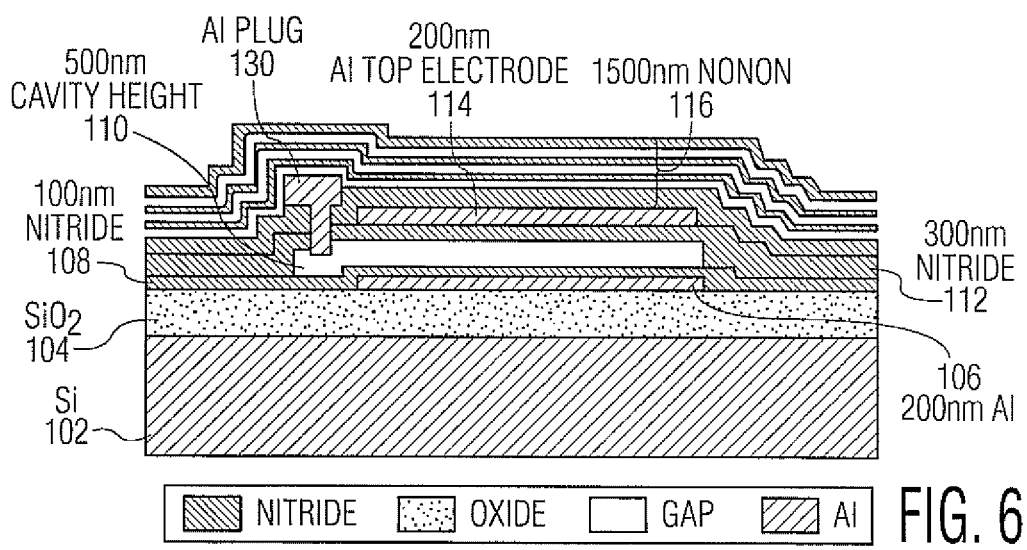
FIG. 6 illustrates the formation of the pressure membrane with the final encapsulation.

Once the cavity 110 is sealed, the pressure membrane 116 may be formed. FIG. 6 illustrates the formation of the pressure membrane 116. The pressure membrane 116 may be formed by alternatively depositing SiO and SiN using a PECVD process. The alternating layers of SiO and SiN are known as a NONON stack. Alternatively, SiON may be used instead of SiN. NONON for the purposes of this description, includes at least two different alternating layers, wherein one layer includes at least silicon and oxygen and the other layer includes at least silicon and nitrogen. During deposition of the NONON stack the pressure difference inside and outside the cavity 110 may become small and the pressure membrane 116 may return to its normal state. After the NONON deposition, the pressure membrane 116 may obtain its final rigidity and may show a small deflection when exposed to higher pressures.

At this time electrical connections and bond pads may be manufactured in a standard way. As last step a nitride layer may be deposited on top of the NONON and any electrical connections to the MEMS pressure sensor 100 to protect, isolate, and passivate the electrical connections.

Single layer films such as SiN used as pressure membranes have issues that the use of a NONON membrane overcomes. SiN films deposited using PECVD may have high residual stress that may lead to failure of the pressure membrane or that may impact device performance and sensitivity. SiN films may outgas hydrogen, $H_2$, into the chamber 110 increasing the pressure in the cavity that leads to reduced accuracy and temperature independence of the pressure sensor.

By using a NONON membrane design, any of the issues related to mechanical, structural and chemical stability of a single silicon nitride membrane may be overcome. By alternating layers of SiO and SiN, stress in the pressure membrane may be reduced. This allows for increased pressure sensor sensitivity or increased pressure membrane thickness. A thicker pressure membrane allows for increased resistance to mobile ion diffusion when the sensor is in a harsh environment.

A NONON stack of PECVD SiN combined with PECVD SiO may allow for the fine tuning of the internal stress and Young's modulus of the resulting pressure membrane. This may allow for the deposition of more nitrogen rich SiN films that may have better diffusion barrier properties and lower hydrogen effusion rates than the low stress SiN films. Stress and rigidity of the films is thus controlled upon laminating the PECVD silicon nitride with PECVD silicon oxide while being able to improve independently the diffusion barrier properties of the PECVD SiN.

In order to show the diffusion effectiveness of a NONON membrane, an 8× alternating SiN and SiO was placed as a capping layer on top of metallic lithium. The test did not show degradation after 3 months: water or oxygen diffusion through pinholes in the film would instantly oxidize the metallic lithium underneath which can be easily detected with an optical microscope The dimensions of the MEMS pressure sensor 100 may be tuned such that the rigidity of the membrane is large enough to resist normal pressures. Below an equation is given for the deflection of a circular membrane that may be used to calculate the closing pressure as function of membrane thickness, membrane radius and gap size. The deflection of a circular membrane $w_D(r,P)$ in the flexural rigidity dominated regime as function of pressure P is given by $$w_D(r, P) = \frac{3P\pi R^4(1-v^2)}{16\pi Eh^3}\left[1-\left(\frac{r}{R}\right)^2\right]^2.$$

Where R is the radius of the pressure membrane and r the distance from the center to the actual deflection point, v the Poisson ratio, E the Young's modulus and h the membrane thickness.

Figure 7:
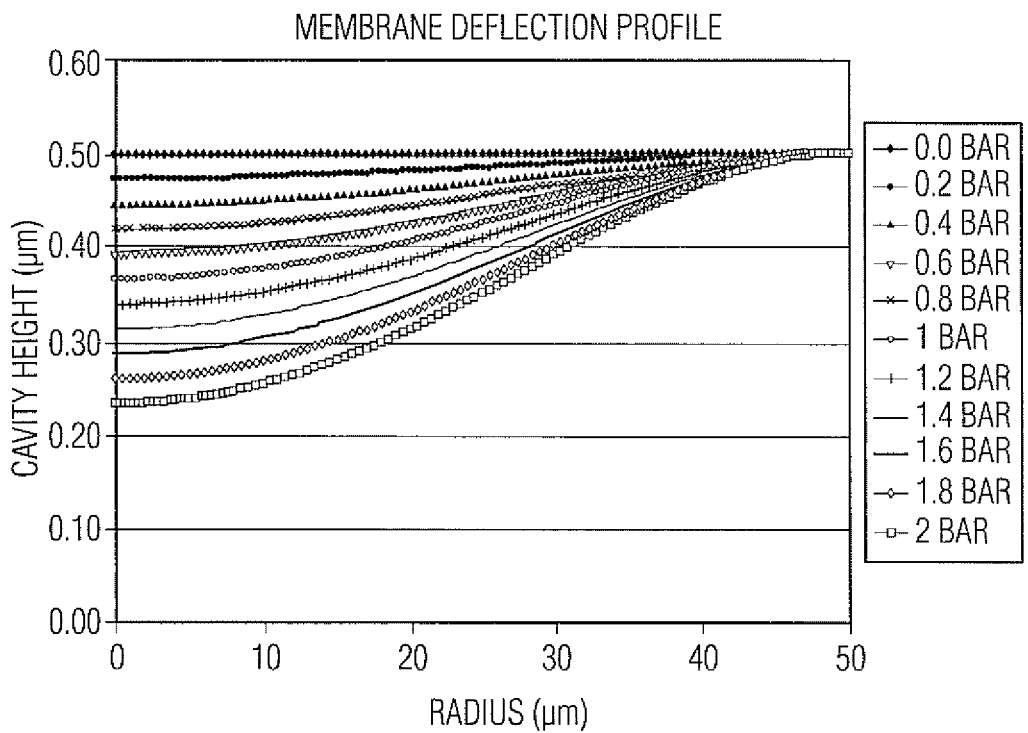
FIG. 7 illustrates a plot of the pressure membrane deflection as a function of radius and for various pressures.

FIG. 7 illustrates a plot of the pressure membrane deflection as a function of radius and for various pressures. The NONON pressure membrane has a radius of 50 um and 2.0 um thickness with a cavity height of 0.5 um. As can be seen in the plot of FIG. 7, the defection of the pressure membrane increases with increased pressure and increases closer to the center of the pressure membrane.

Figure 8:
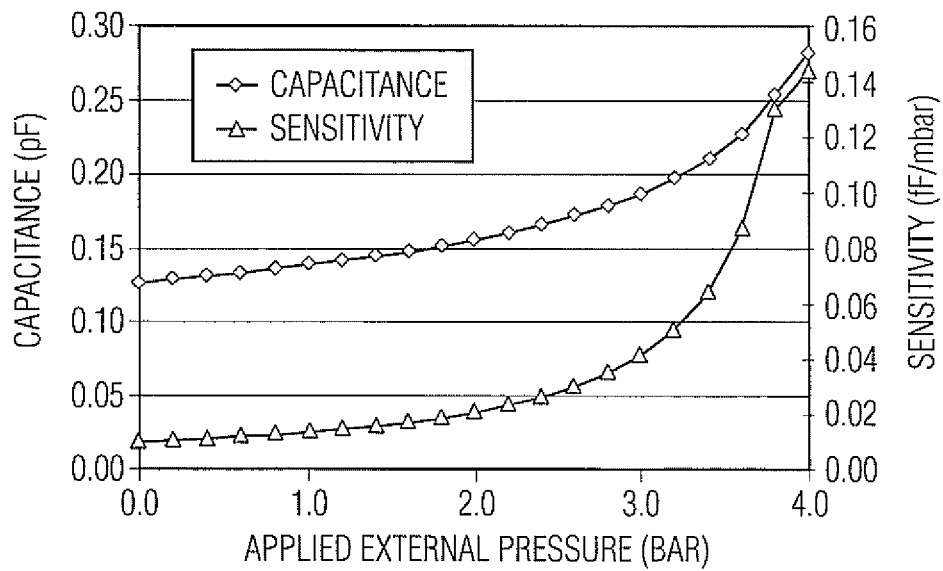
FIG. 8 illustrates a plot of pressure versus the capacitance and sensitivity of MEMS pressure.

FIG. 8 illustrates a plot of pressure versus the capacitance and sensitivity of MEMS pressure. As the pressure membrane deflection increases so does the capacitance and sensitivity. The pressure membrane used in FIG. 8 has a diameter of 100 um, a membrane thickness of 1.5 um, a cavity of 0.5 um, a first insulating layer of 100 nm, and a second insulating layer of 300 nm in accordance with the structure shown in FIG. 1.

The equation for $w_D(r,P)$ is valid for pressure membranes without any internal stress. If internal stress is taken into account the membrane becomes stiffer. The transition from the tension to the stress controlled deflection regime may occur if the internal stress becomes much larger than:

$$\sigma \approx \frac{4Eh^2}{3R^2(1-v^2)}.$$

Figure 9:
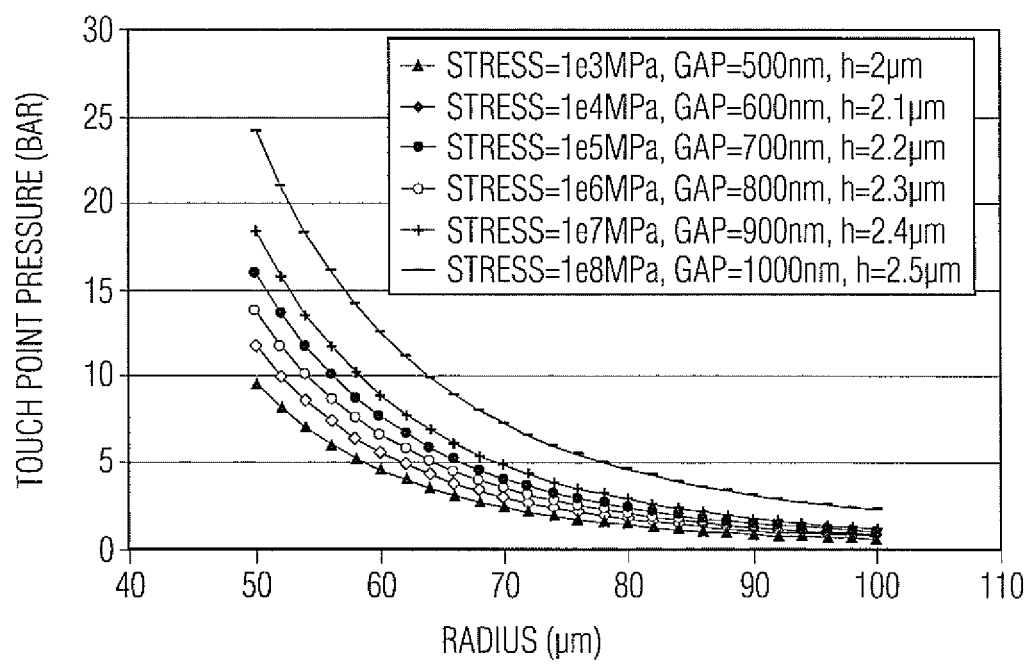
FIG. 9 illustrates the touch point pressure as a function of pressure membrane radius for different internal stress levels, gap height, and pressure membrane thickness with a Young's modulus of 140 MPa.

For a pressure membrane thickness in the order of 1.8 um to 2 um the internal stress level may be >>100 MPa to become stress dominated for diameters larger than 200 um. Below 100 MPa the pressure membrane will remain in the flexural rigidity dominated regime. Typically membrane diameters are employed that are between 100 um to 200 um in size to have a pressure working range for membrane closure between 15 and 1 bar respectively. FIG. 9 illustrates the touch point pressure as a function of pressure membrane radius for different internal stress levels, gap height, and pressure membrane thickness with a Young's modulus of 140 MPa.

Accordingly, it may be most convenient to adjust the pressure range of a MEMS pressure sensor by adjusting the membrane radius instead of the membrane thickness, gap height or instead of fine tuning the internal stress of the pressure membrane.

A gap height from manufacturing point of view may vary between 300 nm to 1000 nm. Smaller gaps may induce problems with the removal of the sacrificial layer especially if the membrane radius is large that may require long etch times that poses constraints on the selectivity of the etchants. Large gaps may be more costly to manufacture and create additional topography. Moreover, it may take larger pressure to fully deflect a membrane to its touch point unless a thinner membrane is applied.

The thickness of the membrane may be chosen to be equal to or larger than the gap distance to keep the device in the flexural rigidity controlled regime. This may be beneficial because this may reduce the impact of residual stress due to process variations on the deflection profile.

The upper and lower electrodes 106, 114 may be 200 nm thick Al. The thinner the electrodes the smaller the temperature expansion. Alternatively other materials can be used to reduce the thermal expansion coefficient or stress. In this respect TiN, W, Si, SiGe, metal silicides may be used. Also, upper electrode 116 may be structured to relieve stress.

The disclosed MEMS pressure sensor 100 has an advantage in that it may be constructed on top of CMOS circuits so that other functions may be embedded and integrated together with the sensor. A further advantage is that the total device size may be small which allows integration in practically any device. Also, the pressure sensing range may be chosen based on the membrane diameter without having to change and optimize a process manufacturing flow. Another advantage is that an array of pressure sensors of different diameters may be constructed that each has their own optimum sensitivity in a certain pressure range.

While use of the NONON film as a pressure membrane in a pressure sensor has been discussed for use in a Li-ion battery, it may be used in any other situation where a pressure sensor is needed. It is especially suited for use in harsh environments.

It should be appreciated by those skilled in the art that any block diagrams herein represent conceptual views of illustrative circuitry embodying the principles of the invention. Similarly, it will be appreciated that any state transition diagrams, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

I claim:

1. A MEMS pressure sensor comprising:
   a lower electrode;
   an upper electrode over the lower electrode;
   an insulating layer between the lower and upper electrodes that forms a cavity between the upper and lower electrodes; and
   a NONON pressure membrane over the upper electrode.

2. The MEMS pressure sensor of claim 1, further comprising a metal plug that seals the cavity.

3. The MEMS pressure sensor of claim 2, wherein the metal plug is completely outside an area between the upper and lower electrodes.

4. The MEMS pressure sensor of claim 1, wherein the MEMS pressure sensor is formed on another circuit on a substrate.

5. The MEMS pressure sensor of claim 1, wherein the NONON pressure membrane prevents contamination of the cavity and an electrical circuit.

6. A MEMS pressure sensor of claim 1, wherein the MEMS pressure sensor is in a Li-ion battery.

7. A method of producing a MEMS pressure sensor, comprising:
   forming a lower electrode on a substrate;
   forming a sacrificial layer over the first lower electrode;

forming a first insulating layer over the sacrificial layer and the lower electrode;
forming an upper electrode over the first insulating layer;
forming a second insulating layer over the upper electrode and the first insulating layer;
etching the sacrificial layer to form a cavity;
closing the cavity to form a vacuum in the cavity; and
growing a NONON pressure membrane over the second insulating layer and the cavity.

8. The method of claim 7, wherein the upper and lower electrodes are one of aluminum, tungsten, Ti, TiN, Si, SiGe, and metal silicide.

9. The method of claim 7, wherein the sacrificial layer is silicon oxide.

10. The method of claim 7, wherein closing the cavity includes plugging an etching hole with a metal plug by depositing the metal using physical vapor deposition.

11. The method of claim 7, wherein the NONON membrane is formed using a PECVD process.

12. The method of claim 7, wherein the MEMS pressure sensor is formed on another circuit on the substrate.

13. The method of claim 7, further comprising forming a third insulating layer between the lower electrode and the sacrificial layer.

14. The method of claim 13, wherein the sacrificial layer is one of molybdenum, aluminum, titanium or tungsten.

15. A method of producing a MEMS pressure sensor, comprising:

forming a lower electrode on a substrate;
forming a first insulating layer over the lower electrode;
forming a sacrificial layer over the first insulating layer;
forming an upper electrode over the sacrificial layer;
etching the sacrificial layer to form a cavity;
closing the cavity to form a vacuum in the cavity; and
growing a NONON pressure membrane over a second insulating layer and the cavity.

16. The method of claim 15, wherein the upper and lower electrodes are one of aluminum, tungsten, Ti, TiN, Si, SiGe, and metal silicide.

17. The method of claim 15, wherein the sacrificial layer is silicon dioxide.

18. The method of claim 15, wherein the sacrificial layer is one of molybdenum, aluminum, chromium, titanium or tungsten.

19. The method of claim 15, wherein closing the cavity includes plugging an etching hole with a metal plug by depositing the metal using physical vapor deposition.

20. The method of claim 15, wherein the NONON membrane is formed using a PECVD process.

21. The method of claim 15, wherein the MEMS pressure sensor is formed on another circuit on the substrate.

22. The method of claim 15, further comprising forming a third insulating layer between the sacrificial layer and the upper electrode.

* * * * *